United States Patent
Cook et al.

(10) Patent No.: US 10,513,455 B2
(45) Date of Patent: Dec. 24, 2019

(54) METHOD AND APPARATUS FOR SEALING THE EDGE OF A GLASS ARTICLE

(71) Applicant: Corning Incorporated, Corning, NY (US)

(72) Inventors: Thomas Roger Cook, Corning, NY (US); Christopher William Drewnowski, Corning, NY (US); Peter Knowles, Elmira, NY (US); Geunsik Lim, Corning, NY (US); Moussa N'Gom, Ann Arbor, MI (US); Irene Mona Peterson, Elmira Heights, NY (US); Robert Stephen Wagner, Corning, NY (US)

(73) Assignee: Corning Incorporated, Corning, NY (US)

(*) Notice: Subject to any disclaimer, the term of this patent is extended or adjusted under 35 U.S.C. 154(b) by 199 days.

(21) Appl. No.: 15/521,112

(22) PCT Filed: Oct. 29, 2015

(86) PCT No.: PCT/US2015/057935
§ 371 (c)(1),
(2) Date: Apr. 21, 2017

(87) PCT Pub. No.: WO2016/069828
PCT Pub. Date: May 6, 2016

(65) Prior Publication Data
US 2017/0355633 A1    Dec. 14, 2017

Related U.S. Application Data

(60) Provisional application No. 62/072,682, filed on Oct. 30, 2014.

(51) Int. Cl.
*B32B 41/00*    (2006.01)
*C03B 23/20*    (2006.01)
(Continued)

(52) U.S. Cl.
CPC ............. *C03B 23/20* (2013.01); *B23K 26/08* (2013.01); *B23K 26/206* (2013.01);
(Continued)

(58) Field of Classification Search
CPC ..... C03B 23/20; C03B 25/025; C03B 23/203; B23K 26/08; B23K 26/206; C03C 17/02;
(Continued)

(56) References Cited

U.S. PATENT DOCUMENTS 1,705,631 A    3/1929    Bartelstone
4,023,953 A    5/1977    Megles, Jr. et al.
(Continued)

FOREIGN PATENT DOCUMENTS

CN    101076447 A    11/2007
CN    102403466        4/2012
(Continued)

OTHER PUBLICATIONS

Junjie Luo et al "Additive Manufacturing of Glass" ASME Journal of Manufacturing Science and Engineering, Oct. 15, 2014, pp. 1-31.
(Continued)

*Primary Examiner* — Michael N Orlando
*Assistant Examiner* — Joshel Rivera
(74) *Attorney, Agent, or Firm* — Michael A. Hood; Svetlana Z. Short

(57) ABSTRACT

An apparatus includes a fiber feeding system to deposit a fiber on an edge of the glass article and a laser system. The laser system is positioned to project a first and a second laser beam onto a first and a second side of the fiber, respectively. The laser system is positioned to project a third laser beam onto the edge of the glass article. A method includes advancing a glass article relative to a fiber; positioning the fiber in relation to an edge of the glass article, contacting a first side of the fiber with a first laser beam, contacting a
(Continued)

second side of the fiber with a second laser beam, depositing the fiber on the edge of the glass article, and contacting the edge of the glass article with a third laser beam.

21 Claims, 7 Drawing Sheets

(51) Int. Cl.
    *C03B 23/203* (2006.01)
    *C03C 17/02* (2006.01)
    *C03C 23/00* (2006.01)
    *B23K 26/08* (2014.01)
    *B23K 26/20* (2014.01)
    *C03B 25/02* (2006.01)

(52) U.S. Cl.
    CPC .......... *C03B 23/203* (2013.01); *C03B 25/025* (2013.01); *C03C 17/02* (2013.01); *C03C 23/0025* (2013.01); *C03C 2217/78* (2013.01); *C03C 2218/13* (2013.01)

(58) Field of Classification Search
    CPC ............ C03C 23/0025; C03C 2218/13; C03C 2217/78
    USPC ........................... 156/64, 350, 351, 378, 379
    See application file for complete search history.

(56) References Cited

U.S. PATENT DOCUMENTS

| | | |
|---|---|---|
| 4,214,886 A | 7/1980 | Shay et al. |
| 4,801,488 A | 1/1989 | Smith |
| 6,709,750 B1 | 3/2004 | Pohlmann et al. |
| 8,148,179 B2 | 4/2012 | Aitken et al. |
| 8,287,995 B2 | 10/2012 | Shibuya et al. |
| 2007/0007894 A1 | 1/2007 | Aitken et al. |
| 2011/0014731 A1 | 1/2011 | Nguyen et al. |
| 2012/0131959 A1 | 5/2012 | No et al. |
| 2012/0147538 A1 | 6/2012 | Kawanami et al. |
| 2014/0216108 A1 | 8/2014 | Wiegel et al. |
| 2015/0368141 A1 | 12/2015 | Bergman et al. |
| 2016/0152006 A1 | 6/2016 | Boek et al. |
| 2017/0246841 A1 | 8/2017 | Chaparain |

FOREIGN PATENT DOCUMENTS

| | | |
|---|---|---|
| CN | 102690046 | 9/2012 |
| CN | 102971264 A | 3/2013 |
| CN | 103702952 A | 4/2014 |
| JP | 2001177082 A | 6/2001 |
| WO | 2013130665 A2 | 9/2013 |
| WO | 2014160534 A1 | 10/2014 |

OTHER PUBLICATIONS

Thermal modeling of laser welding and related processes: a literature review (Optics & Laser Technology 37 (2005) 99-115).
Review of laser hybrid welding (Journal of Laser Application, vol. 17, No. 1, Feb. 2005).
Direct welding of fused silica with femtosecond fiber laser (Society of Photo-Optical Instrumentation Engineers (SPIE) Conference Series, Feb. 2012).
International Search Report and Written Opinion of the International Searaching Authority; PCT/US2015/057935 dated Dec. 29, 2015; 7 Pages; Commissioner of Patents.
English Translation of CN201580071499.8 First Office Action dated Mar. 4, 2019, China Patent Office, 11 Pgs.

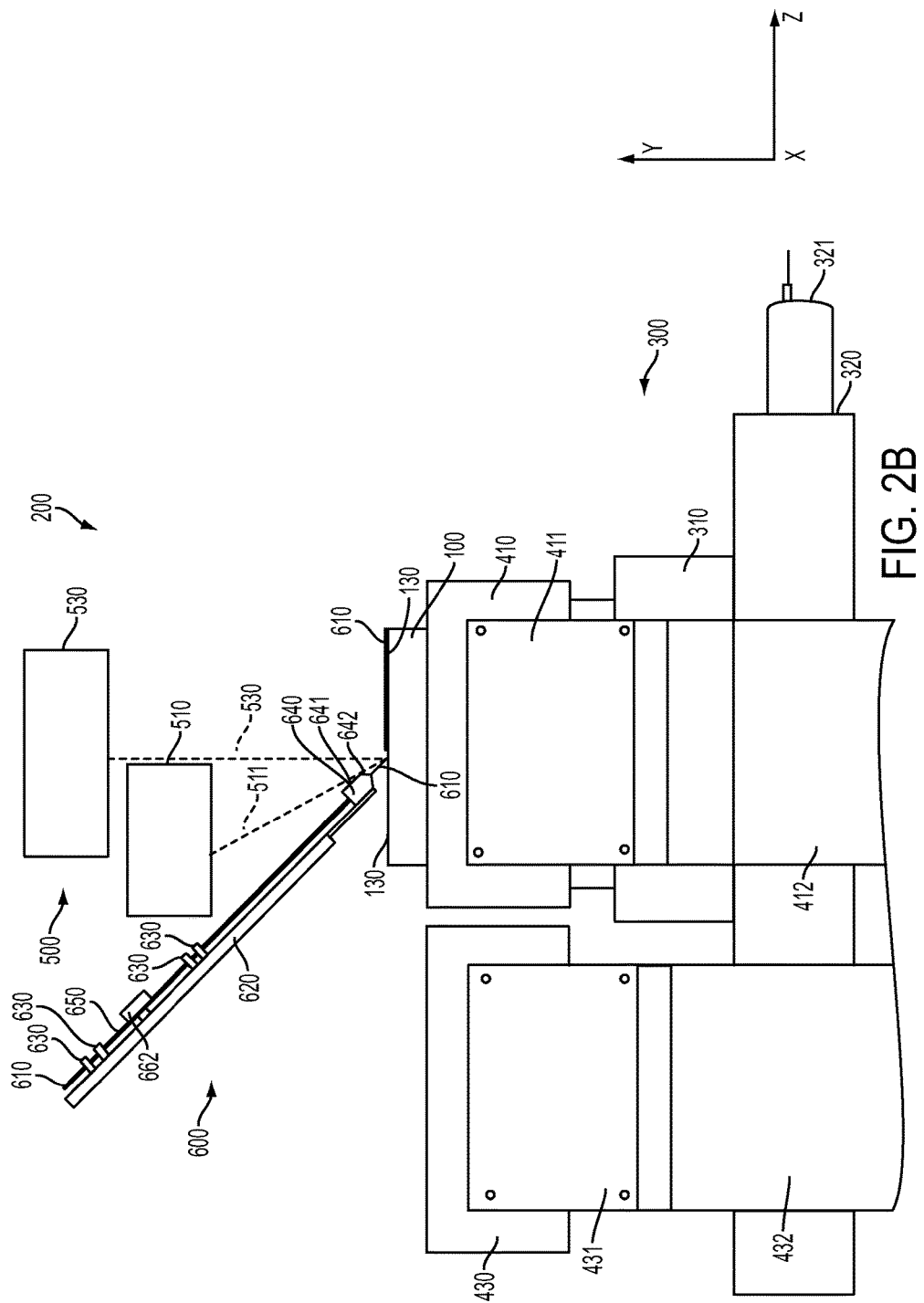

METHOD AND APPARATUS FOR SEALING THE EDGE OF A GLASS ARTICLE

This application claims the benefit of priority to International Application No. PCT/US2015/057935, filed Oct. 29, 2015, which claims the benefit of priority to U.S. Application No. 62/072,682, filed on Oct. 30, 2014, the content of each of which is incorporated herein by reference in its entirety.

BACKGROUND

Field

The present specification generally relates to sealing the edge of a glass article and, more specifically, to welding a glass fiber to the edge of article.

Technical Background

When a glass article is cut from a larger glass sheet or ribbon, the edges of the glass article exposed by cutting may have inherent imperfections and exposed inclusions that result from the cutting process. These imperfection and inclusions on the exposed edges of the cut glass article represent weak points in the glass article that can lead to cracking, fracture, and other damage if the weakness is exposed to an outside force, such as by dropping the glass article on its edge or forcefully contacting an edge of the glass article with another object.

Accordingly, a need exists protected the edges of cut glass articles by covering imperfections and inclusions exposed during the cutting process.

SUMMARY

According to one embodiment, an apparatus comprises: a fiber feeding system to deposit a fiber on the edge of the glass article; and a laser system configured to emit at least a first laser beam, a second laser beam, and a third laser beam. The laser system is positioned to project the first laser beam onto a first side of the fiber at a contact point that is from about 10 µm to less than about 1000 µm from the edge of the glass article. The laser system is positioned to project the second laser beam onto a second side of the fiber that is opposite the first side of the fiber at the contact point. The laser system is positioned to project the third laser beam onto the edge of the glass article at a point that is from about 0.1 mm to less than about 1 mm from a point where the fiber is deposited on the edge of the glass article.

According to another embodiment, a method comprises: advancing the glass article relative to a fiber; positioning the fiber in relation to an edge of the glass article; contacting a first side of the fiber with a first laser beam and contacting a second side of the fiber with a second laser beam at a point that is from about 10 µm to less than about 1000 µm from the edge of the glass article; depositing the fiber on the edge of the glass article; and contacting the edge of the glass article with a third laser beam at a point that is from about 0.1 mm to less than about 1 mm from a point where the fiber is deposited on the edge of the glass article.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 2B is a schematic side view of an edge sealing apparatus according to embodiments disclosed and discussed herein;

Figure 1:
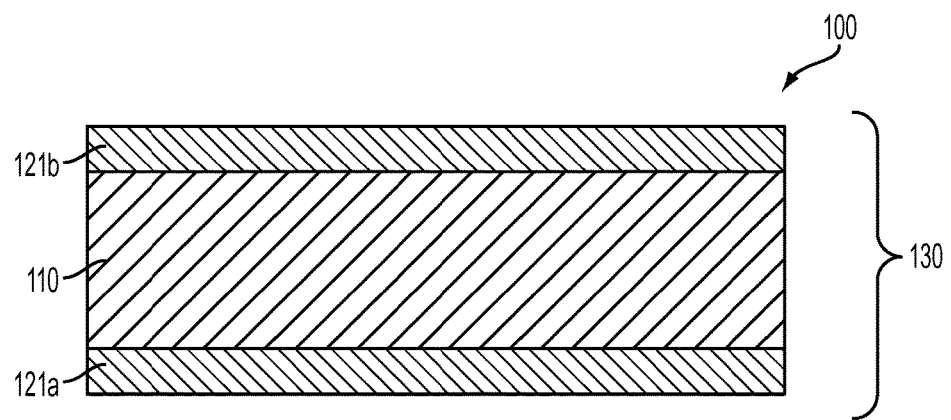
FIG. 1 is a schematic view of an exemplary laminated glass article having an exposed edge.

Cartesian axes are shown in the figures for the sake of reference only and are not intended to be limiting with respect to direction or orientation. Additionally, for the sake of reference only and not by way of limitation, the Cartesian axes shown in the figures include arrows that consistently define a particular direction with respect to each axis in all figures that depict the same object in different orientations. Throughout this disclosure, relational terms will be used by a convention in view of the Cartesian axes of the figures and the positive directions indicated by the arrows. According to the convention, relationships relative to the x-direction of any object may be expressed using terms such as left, right, to the left of, or to the right of. According to the convention, relationships relative to the y-direction of any object may be expressed using terms such as top, bottom, above, below, over, or under. According to the convention, relationships relative to the z-direction of any object may be expressed using terms such as front, back, in front of or proximal to, or behind or distal to. Neither the convention nor the terms used to express various relationships are intended to limit any object or component thereof to a direction or orientation in construction or in use.

DETAILED DESCRIPTION

Reference will now be made in detail to embodiments of apparatuses and methods for sealing edges of glass articles with reference to the figures. Whenever possible, the same reference numerals will be used throughout the figures to refer to the same or like parts. In one embodiment, an apparatus for sealing an edge of a glass article is disclosed. The apparatus comprises: a fiber feeding system to deposit a fiber on the edge of the glass article; and a laser system comprising at least a first laser, a second laser, and a third laser. The first laser is positioned to project a first laser beam onto a first side of the fiber at a contact point that is from about 10 μm to less than about 1000 μm from the edge of the glass article. The second laser is positioned to project a second laser beam onto a second side of the fiber that is opposite the first side of the fiber at the contact point. The third laser is positioned to project a third laser beam onto the edge of the glass article at a point that is from about 0.1 mm to less than about 1 mm from a point where the fiber is deposited on the edge of the glass article.

In another embodiment, a method for forming a sealed glass article is disclosed. The method comprises: advancing the glass article relative to a fiber; positioning the fiber in relation to an edge of the glass article; contacting a first side of the fiber with a first laser beam and contacting a second side of the fiber with a second laser beam at a point that is from about 10 μm to less than about 1000 μm from the edge of the glass article; depositing the fiber on the edge of the glass article; and contacting the edge of the glass article with a third laser beam at a point that is from about 0.1 mm to less than about 1 mm from a point where the fiber is deposited on the edge of the glass article.

Conventional methods for strengthening and protecting edge surfaces of a cut glass article include etching or grinding combined with polishing to remove a surface layer of the edge with imperfections and inclusions that could lead to damage of the glass article. However, particularly in laminated glass articles, etching can lead to inconsistent contours in the glass article that are caused by the presence of glass materials that etch at different rates. Additionally, grinding and polishing can lead to different levels of material removal based upon the differences in glass composition of the layers or can even lead to cracking if high tension is present. Another method for strengthening and protecting edge surfaces in a cut glass article is flame polishing, but flame polishing leaves an inner core of the glass article exposed, which can cause the edge of the glass article to crack from the thermal shock present when heating the glass with the flame. Therefore, apparatuses and method for sealing edges of a glass article are provided where a viscous layer of a fiber is applied to the edge of a cut glass article and covers a portion or the entirety of the exposed edge. The application of this viscous glass material does not cause physical, chemical, or thermal damage on the edge of the glass article, and thus is not as likely to damage the glass article as conventional methods.

In embodiments, the glass article that is cut is a laminated glass article. Laminated glass articles generally comprise two or more layers of glass that are fused together to form a single, unitary body. In some embodiments, a laminated glass article comprises a glass sheet. The glass sheet can be substantially planar (e.g., flat) or non-planar (e.g., curved). In other embodiments, a laminated glass article comprises a formed or shaped glass article comprising a three-dimensional (3D) shape. For example, a formed glass article can be formed by molding or shaping a glass sheet to provide the desired 3D shape.

An exemplary structure of a laminated glass article according to embodiments is shown in FIG. 1, which schematically depicts a laminated glass article having three glass layers. In the embodiment shown in FIG. 1, a laminated glass article 100 comprises a core layer 110 and clad layers 121a and 121b. The laminated glass article of embodiments, such as laminated glass article 100 above, may be formed using an overflow fusion process, such as the process disclosed in U.S. Pat. No. 4,214,886, which is incorporated herein by reference in its entirety. In the embodiment shown in FIG. 1, the clad layers 121a and 121b have substantially the same or the same thickness. However, it should be understood that the dimensions of the core layer 110 and the clad layers 121a and 121b in FIG. 1 are illustrative only and that in other embodiments various thicknesses may be used. Although the laminated glass article shown in FIG. 1 comprises two clad layers, it should be understood that, according to some embodiments, laminated glass articles may comprise multiple layers. For example, embodiments may include laminated glass articles that comprise 2n+1 layers, where n is the number of clad layers applied to each side of the core (for example, in the three-layered structure shown in FIG. 1, n=1 because there is one clad layer, but it is present on both sides of the core). In various embodiments, a glass layer can comprise a glass material, a glass-ceramic material, or a combination thereof.

In some embodiments, the interfaces between the clad layer 121a and the core layer 110 and/or between the clad layer 121b and the core layer 110 (or between other adjacent glass layers) are free of any bonding material such as, for example, an adhesive, a coating layer, or any non-glass material added or configured to adhere the respective glass layers to each other. Thus, the clad layers 121a and 121b are fused or applied directly to the core layer 110 or are directly adjacent to the glass core layer 110. In some embodiments, the laminated glass article comprises one or more intermediate layers disposed between the core layer 110 and the clad layers 121a and 121b. For example, the intermediate layers may comprise intermediate glass layers and/or diffusion layers formed at the interface of the core layer 110 and the clad layers 121a and 121b (e.g., by diffusion of one or more components of the glass core and glass cladding layers into the diffusion layer). In some embodiments, the laminated glass article comprises a glass-glass laminate (e.g., an in situ fused multilayer glass-glass laminate) in which the interfaces between directly adjacent glass layers are glass-glass interfaces.

According to embodiments, the laminated glass article 100 has an edge 130 that is exposed when the laminated glass article 100 is cut. The exposed edge 130 comprises portions of the core layer 110 and the clad layers 121a and 121b. In addition to the imperfections and inclusion disclosed above that may be exposed when a glass article is cut, the laminated glass article 100 may also comprise internal stress, such as compressive and tensile stresses, that arise when the laminated glass article 100 is formed from core material that has a different coefficient of thermal expansion (CTE) than the clad material. For example, if the core layer 110 expands more or less than the clad layers 121a and 121b, compressive stress will be formed in either the core layer 110 or the clad layers 121a and 121b, and tensile stress may be present in the other of the core layer 110 and the clad layers 121a and 121b. Therefore, having an exposed edge 130 of the laminated glass article 100 allows these layers having compressive or tensile stress exposed to possible external forces. If one or more layers having tensile stress are exposed to an external force, such as by dropping or bumping the exposed surface, damage or fracture to the laminated glass article may occur. Accordingly, while it may be desirable to seal a cut edge of any glass article to cover inclusions or imperfections caused by the cutting, it may be particularly beneficial to seal the cut edge of a laminated glass article so that layers having tensile or compressive stress are not exposed.

Figure 2A:
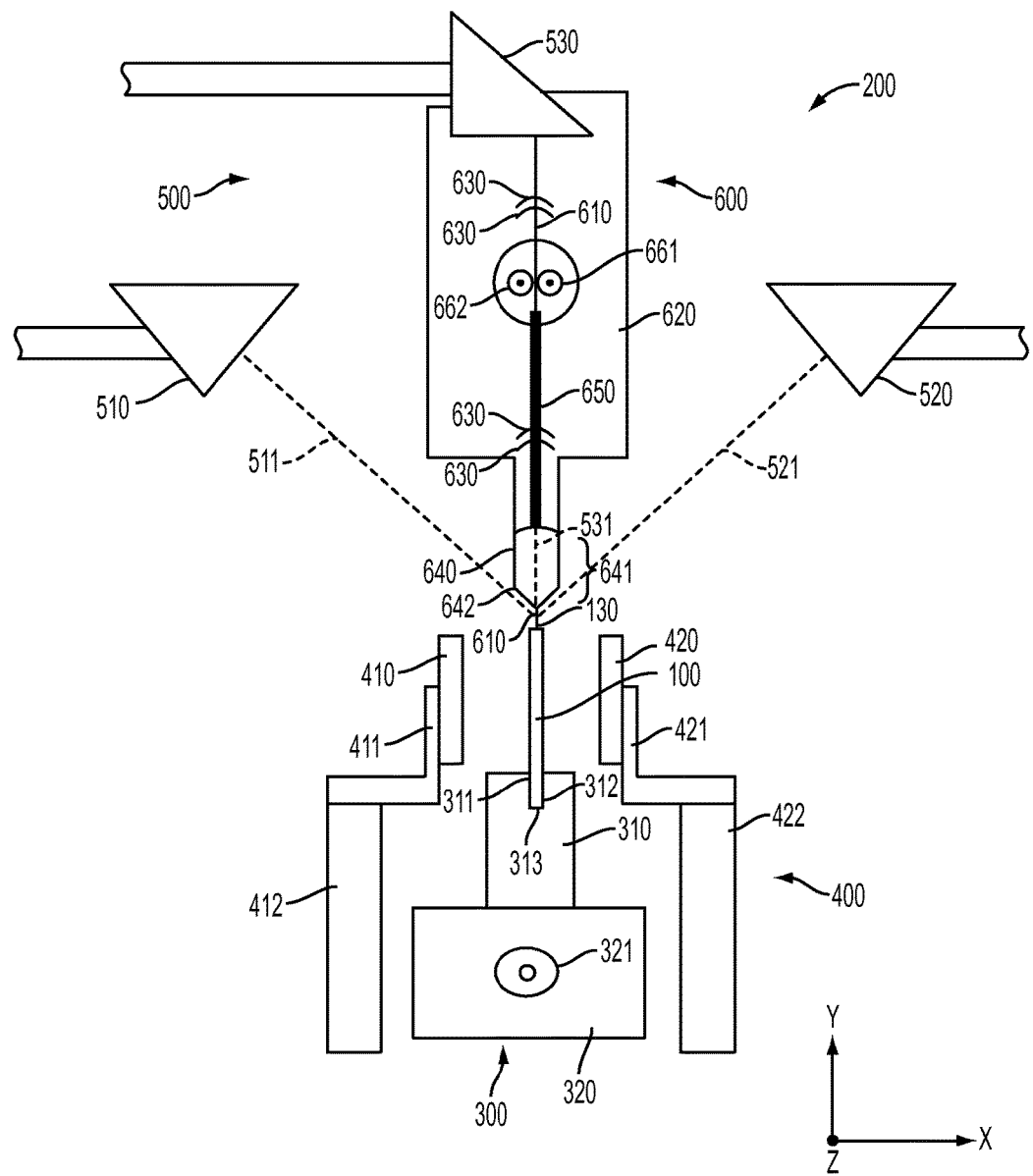
FIG. 2A is a schematic front view of an edge sealing apparatus according to embodiments disclosed and discussed herein.

FIG. 2A and FIG. 2B are a schematic front view and a schematic a side view, respectively, of an edge sealing apparatus 200 for sealing an edge 130 of a target glass article, such as the laminated glass article 100 described above and shown in FIG. 1. In the embodiment shown in FIG. 2A and FIG. 2B, the edge sealing apparatus 200 comprises four systems: a glass article advancement system 300 that advances the target glass article 100 through the edge sealing apparatus 200; a glass article pre-heating system 400 that heats the targeted glass article 100; a fiber feeding system 600 that supplies a fiber 610 to an edge surface 130 of the target glass article 100; and a laser system 500, for heating the fiber 610 and the edge 130 of the target glass article 100. According to the embodiment shown in FIG. 2A, the laser system 500 comprises lasers 510 and 520 for heating the fiber 610 and laser 530 for heating the edge 130 of the target glass article 100. In broad terms, the edge sealing apparatus 200 operates by feeding and guiding a fiber 610 to the edge 130 of the target glass article 100 via the fiber feeding system 600. The laser system 500 is configured so that lasers 510 and 520 are positioned to heat the fiber 610 with corresponding laser beams 511 and 521, respectively, so that the fiber 610 is viscous just prior to contact with the edge 130 of the target glass article 100. Additionally, the laser system 500 is configured so that laser 530 is positioned to heat the edge 130 of the target glass article 100 with laser beam 531 at a predetermined point on the edge 130 of the target glass article 100. The glass article advancement system 300 holds the target glass article 100 via a holder 310 and advances the glass article through the edge sealing apparatus 200 in the z-direction so that the viscous glass fiber 610 is evenly applied to the edge 130 of the target glass article 100. Additionally, the glass article pre-heating system 400 comprises heaters 410 and 420 that uniformly heat the target glass article 100 to a temperature that aids the adhesion of the fiber 610 to the edge 130 of the target glass article 100. Each of the four systems is described in more detail below with reference to the figures.

A glass article advancement system according to embodiments is described with reference to FIG. 2A and FIG. 2B. The glass article advancement system comprises a mechanism for holding and advancing the target glass article 100 in the z-direction. In the embodiment shown in FIG. 2A and FIG. 2B, the glass article advancement system comprises a holder 310 for holding a glass article 100. Because of the small dimensions of the edge 130 of the glass article 100 and the small diameter of the fiber 610, the holder 310 should firmly hold the glass article 100. Any slippage of the glass article 100 within the holder 310 may cause the fiber 610 to be misapplied to the edge 130 of the glass article 100. Therefore, in embodiments, a gap 313 in the holder 310 may have a width that is substantially the same as the width of the glass article 100 so that the contact surfaces 311 and 312 of the holder contact the glass article 100 and form a friction fitting between the glass article 100 and the holder 310. Although the holder 310 shown in FIG. 2A is a unitary body, in some embodiments, the holder 310 may be adjustable such that contact surfaces 311 and 312 are moveable in the x-direction. In such embodiments, contact surfaces 311 and 312 may initially be separated by a gap that is greater than the width of the glass article 100 and, subsequent to placing the glass article 100 within the gap, the contact surfaces 311 and 312 are slowly moved toward one another to form tight contact between the contact surfaces 311 and 312 and the glass article 100, thus holding the glass article 100 firmly in place. Contact surfaces 311 and 312 may be moveable by any mechanism, such as, for example, a screw drive that moves contact surfaces 311 and 312 toward one another when the screw is turned in a first direction and are moved away from one another when the screw is moved in a second direction. In some embodiments, the contact surfaces 311 and 312 may be coated with a high-friction coating to facilitate holding the glass article. In other embodiments, one or more of the contact surfaces 310 and 311 may comprise suction cups or apertures connected to a vacuum that create suction to hold the glass article firmly in the holder 310. In yet other embodiments the apparatus may comprise only one contact surface that comprises suction cups or apertures connected to a vacuum that hold the glass article firmly in place, such as a vacuum chuck.

The glass article advancement system also comprises an advancement platform 320 that houses a driving mechanism (not shown). The driving mechanism is detachably coupled to the holder 310 and advances the holder 310 in the z-direction such that a glass article 100 that is positioned in the holder 310 is advanced through the glass article pre-heating system and is moved in relation to the fiber feeding system so that the exposed edge 130 of the glass article 100 is covered with the viscous fiber 610 as it passes under the fiber feeding system 600. The driving mechanism may be any conventional driving mechanism that is capable of moving the holder 310 through the edge sealing apparatus 200, such as a chain drive, a belt drive, a screw drive, and the like. The driving mechanism is connected to a motor 321 that moves the driving mechanism and causes the holder 310 to advance through the edge sealing apparatus 200.

The speed at which the holder 310, and thus the glass article 100, is advanced through the edge sealing apparatus 200 by the glass article advancement system 300 will, in part, determine the deposition characteristics of the fiber 610 on the edge 130 of the glass article 100. For example, moving the glass article 100 through the edge sealing apparatus 200 at a slow rate applies a thick layer of the fiber 610 to the exposed edge 130 of the glass article 100, provided that the feed rate of the fiber is held constant. Similarly, moving the glass article 100 through the edge sealing apparatus 200 at a fast rate applies a thin layer of the fiber 610 to the exposed edge 130 of the glass article 100, provided that the feed rate of the fiber is held constant. Therefore, in embodiments, the motor 321 may be a high-precision motor, such as a servomotor or a stepper motor, that is capable of moving the driving mechanism with precision. The motor may be connected to feedback sensors (not shown) that send a signal to a controller (not shown) that precisely controls the movement of the motor and is capable of adjusting the speed at which the holder advances through the edge sealing apparatus 200. Using such a high-precision motor, the deposition characteristics, such as thickness, of the fiber 610 on the edge 130 of the glass article 100 may be modified by altering the speed at which the holder 310 moves through the edge sealing apparatus 200. Although FIG. 2A and FIG. 2B shows only one holder 310, it should be understood that in embodiments multiple holders may be detachably coupled to the driving mechanism so that multiple glass articles may be advanced continuously or semi-continuously through the edge sealing apparatus 200.

Still referring to FIG. 2A and FIG. 2B, the edge sealing apparatus 200 comprises a glass article pre-heating system 400. In embodiments, the glass article pre-heating system 400 comprises heaters 410, 420, and 430. As shown in FIG. 2A heaters 410 and 420 are positioned on the left and right sides of the glass article 100 to provide uniform heating to each broad surface of the glass article 100. In embodiments, the heaters 410, 420, and 430 are positioned above the holder 310 so that the holder 310 is not directly exposed to heat generated from the heaters 410, 420, and 430. As shown in FIG. 2B heaters 410 and 430 may be disposed sequentially in the z-direction so that the glass article 100 is advanced through multiple heaters before it reaches the fiber feeding system 600. Providing sequential heaters in the z-direction allows the glass article 100 to be gradually pre-heated, which reduces thermal stresses that can be formed in the glass article 100 if it is rapidly heated. Although not shown in FIG. 2A or FIG. 2B, a fourth heater is positioned opposite heater 430 in the x-direction to heat an opposing side of the glass article 100. It should be understood that although FIG. 2B shows two separate heaters 410 and 430 positioned on one side of the holder 310, these two separate heaters 410 and 430 may be replaced by one elongated heater. Likewise, multiple heaters on an opposite side of the holder 310 in the x-direction from heaters 410 and 430 may be replaced with one elongated heater.

The heaters 410, 420, and 430 may be held in place by brackets 411, 421, and 431, respectively, that are attached to their respective heaters by fasteners, such as bolts or screws, or an adhesive, such as solder or a weld. The brackets 411, 421, and 431 are supported by vertical supports 412, 422, and 432, respectively, that may be attached to their respective brackets by fasteners, such as bolts or screws, or an adhesive, such as solder or a weld. In some embodiments, the brackets 411, 421, and 431 and the vertical supports 412, 422, and 432 may be a unitary structure. The mechanisms by which brackets 411, 421, and 431 are attached to the heaters 410, 420, and 430 and by which the brackets 411, 421, and 431 are attached to their vertical supports 412, 422, and 432 are not particularly limited so long as the mechanisms can withstand the heat generated by the edge sealing apparatus 200.

In embodiments, heaters 410, 420, and 430 are ceramic filament heaters capable of heating the glass article 100 to a temperature at or near the annealing point of the glass article 100. As used herein, the annealing point is a temperature at which the glass reaches a viscosity of $10^{13.4}$ poise. In some embodiments, the ceramic filament heaters heat the glass article to a pre-heated temperature of from the annealing point temperature to a temperature that is about 100° C. above the annealing point temperature, such as from the annealing point temperature to a temperature that is about 80° C. above the annealing point temperature. In other embodiments, the heaters may be infrared heaters, flame heaters, or other types of heaters capable of heating the glass article to the determined temperature. In embodiments, the heaters heat the glass article to temperatures from about 600° C. to about 800° C., such as from about 650° C. to about 750° C. In other embodiments, the heaters heat the glass article to temperatures from about 675° C. to about 725° C., such as about 700° C. Because the heaters 410, 420, and 430 are stationary, the intensity of the heat emitted from the heaters 410, 420, and 430 sufficient to heat the glass article to the determined temperature will depend on the speed at which the glass article 100 advances through the edge sealing apparatus. For example, the heaters 410, 420, and 430 emit more intense heat when the glass article 100 advances through the edge sealing apparatus at a high speed, and less intense heat when the glass article 100 advances through the edge sealing apparatus at a low speed. Accordingly, in embodiments, the intensity of the heaters is adjustable so that the heaters 410, 420, and 430 are capable of heating the glass article 100 to the determined pre-heated temperature regardless of the speed at which the glass article 100 is advanced through the edge sealing apparatus 200.

The fiber feeding system will now be described with reference to FIG. 2A and FIG. 2B. The fiber feeding system shown in FIG. 2A and FIG. 2B comprises a support structure 620 that supports the mechanisms for feeding a fiber to the edge 130 of a glass article 100. The dimensions of the support structure 620 are not particularly limited and may vary from those shown in FIG. 2A and FIG. 2B depending on the arrangement of the mechanisms that are mounted on the support structure. Accordingly, it should be understood that, in embodiments, the arrangement of the mechanisms mounted on the support structure 620 may differ from the arrangement of the mechanisms shown in FIG. 2A and FIG. 2B. Mounted on the support structure 620 is a plurality of lateral support tabs 630. The fiber 610 is routed through the lateral support tabs 630 to restrain movement of the fiber 610 in the lateral direction (i.e., the x-direction), thus the lateral support tabs 630 are aligned in the x-direction so that the fiber 610 may be routed through the lateral support tabs 630 without bending. In embodiments, the fiber 610 may have a diameter of from about 100 μm to about 600 μm, such as from about 150 μm to about 500 μm. In other embodiments, the fiber 610 may have a diameter of from about 200 μm to about 450 μm, such as from about 250 μm to about 400 μm. In embodiments, the fiber is not sheathed, thus the fiber 610 may be prone to damage if its movement is not restrained. The lateral support tabs 630 may be mounted to the support structure 620 by any suitable method, such as soldering and welding, and, in embodiments, the lateral support tabs 630 may be formed as a unitary body with the support structure 620.

The fiber feeding system shown in FIG. 2A and FIG. 2B comprises a fiber guide tip 640 mounted on the support structure 620. The fiber guide tip 640 is securely mounted to the support structure 620, such as by a fastener or by soldering or welding, and provides precision discharge of the fiber 610 to the edge 130 of a glass article 100. The fiber guide tip 640 comprises a broad portion 641 that is mounted on the support structure 620 and a tapered portion 642 that is not mounted on the support structure 620. The fiber 610 is inserted into the broad portion 641 of the fiber guide tip 640 and then channeled to the tapered portion 642 of the fiber guide tip 620 where the fiber exits the fiber guide tip 620. In embodiments, an opening in the tapered portion 642 of the fiber guide tip 640 has substantially the same diameter as the fiber 610 so that the fiber exits the opening in the tapered portion 642 of the fiber guide tip 640 with extremely high precision. Although the laser beams should not contact the fiber guide tip, in some embodiments, the fiber guide tip 640 is made from a material that is resistant to lasers and does not allow the laser energy to be transmitted through the fiber guide tip 640, thus preventing the fiber 610 from being exposed to the laser energy before the fiber 610 exits the fiber guide tip 640. In embodiments, the fiber guide tip may be comprised of graphite or similar materials.

The fiber feeding system shown in FIG. 2A and FIG. 2B comprises a fiber guide tube 650 extending from the broad portion 641 of the fiber guide tip 640. The fiber guide tube 650 protects the fiber 610 from environmental contaminants and possible damage while it is being fed from the feed wheels 661 and 662 to the fiber guide tip 640. In embodiments, the fiber guide tube 650 is supported by the fiber guide tip 640 and is not otherwise supported on the support structure 620. In some embodiments, the fiber guide tube 650 is supported by lateral supports 630 and the fiber guide tip 640. The fiber guide tube 650 extends upward in the y-direction from a broad portion 641 of the fiber guide tip 640 to a point just below feed wheels 661 and 662. The diameter of the fiber guide tube 650 is greater than the diameter of the fiber 610 so that the fiber 610 may easily enter the fiber guide tube 650 after the fiber 610 exits the feed wheels 661 and 662. In embodiments, the diameter of the fiber guide tube is slightly larger than the diameter of the fiber, such as about 10 μm larger than the diameter of the fiber. In some embodiments, the fiber guide tip 640 and the fiber guide tube 650 may be detachably coupled to the support structure 620 so that the fiber guide tip 640 and the fiber guide tube 650 may be interchangeable with other fiber guide tubes and fiber guide tips that are configured to accommodate fibers with larger or smaller diameters.

Figure 3A:
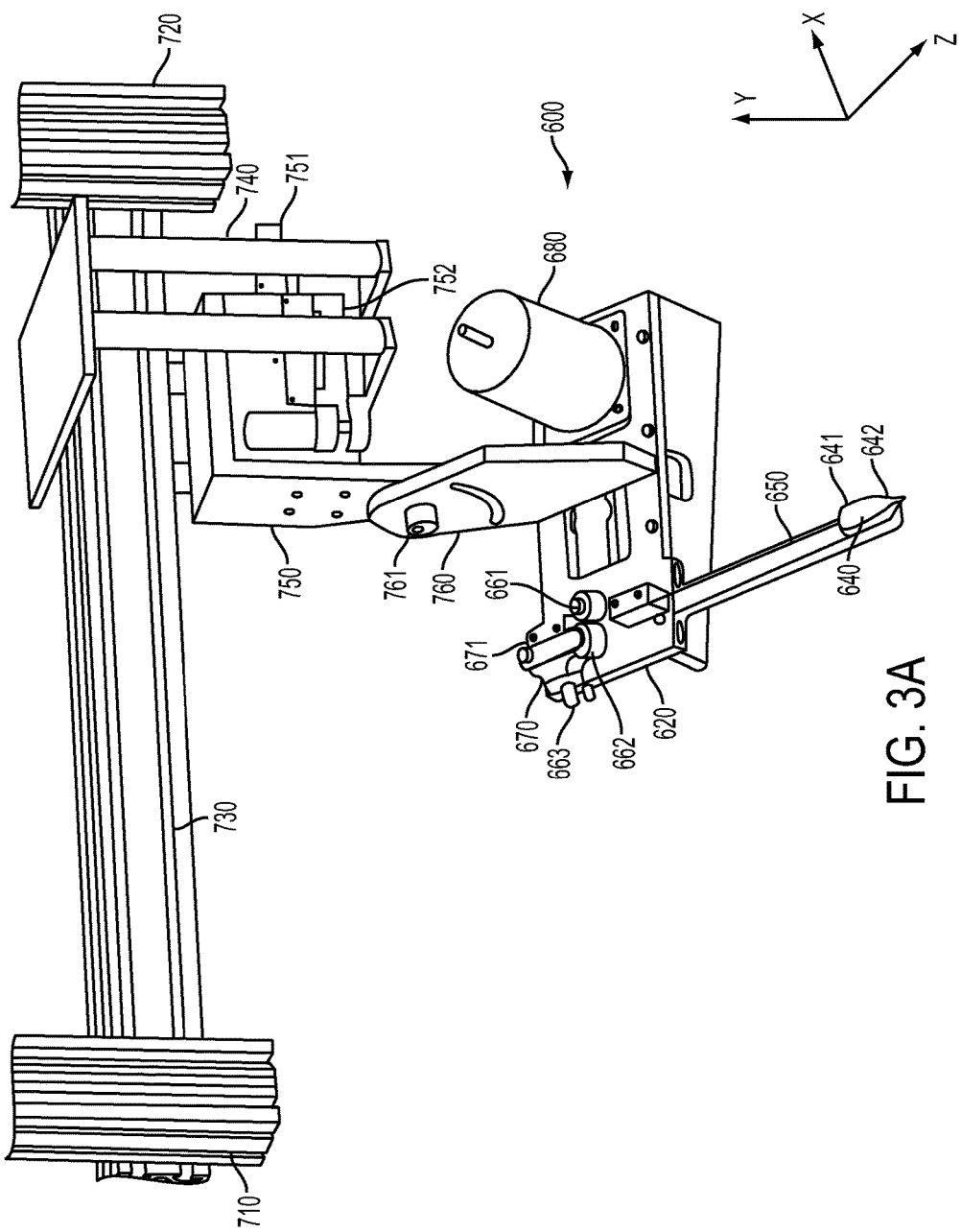
FIG. 3A is a schematic front view of a fiber feeding system according to embodiments disclosed and discussed herein.
Figure 3B:
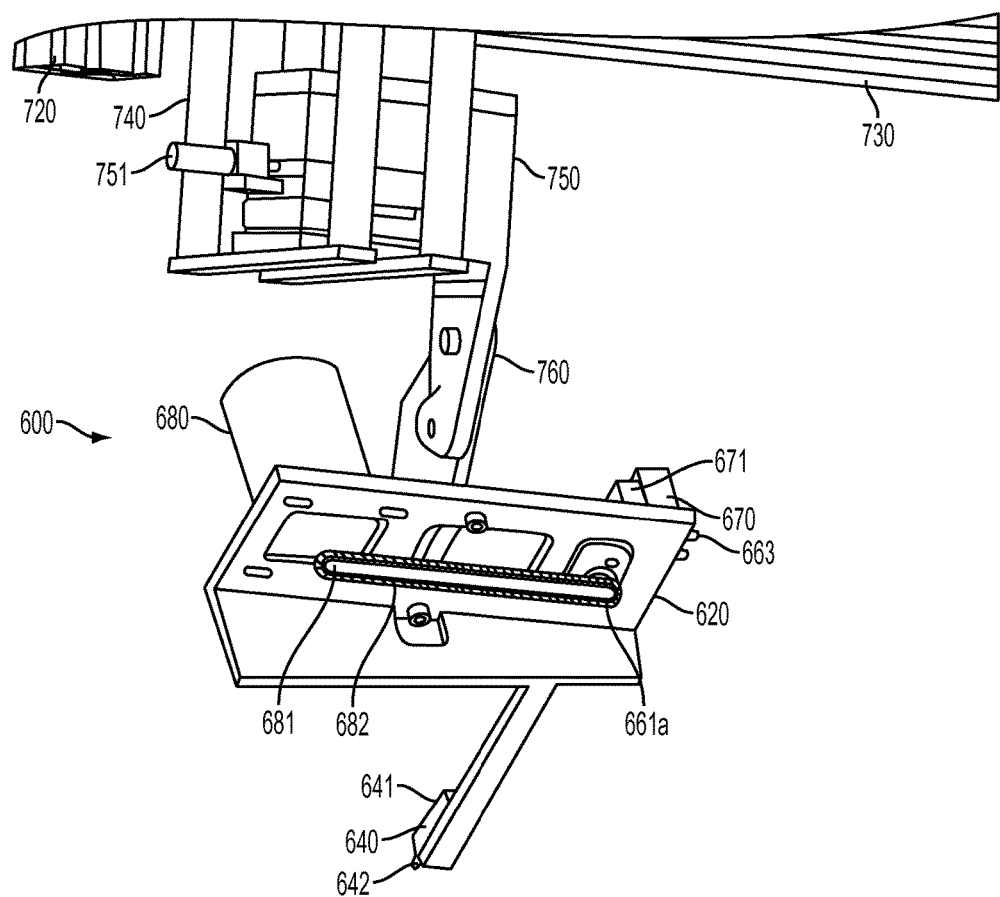
FIG. 3B is a schematic back view of a fiber feeding system according to embodiments disclosed and discussed herein.

The fiber feed system will now be described in more detail with reference to FIG. 3A and FIG. 3B. In embodiments, vertical support structures 710 and 720 are spaced apart in the x-direction and extend upward in the y-direction. Vertical support structures 710 and 720 are connected by the horizontal support structure 730 that extends in the x-direction and comprises a first end that is connected to a vertical support structure 710 and a second end that is connected to a vertical support structure 720. A mounting mechanism 740 is moveably mounted on the horizontal support structure 730. The mounting mechanism 740 may be mounted on the horizontal support structure 730 so that the mounting mechanism 740 moves in the x-direction along the horizontal support structure 730. Further, in some embodiments, the mounting mechanism 740 may be mounted such that it moves in both the y-direction and the z-direction in relation to the horizontal support structure 730 so that the mounting mechanism 740, and thus the support structure 620, is moveable in the x-, y-, and z-directions. In other embodiments, the vertical supports structures 710 and 720 and the horizontal support structure 730 are all moveable and allow the support mounting structure 740, and thus the support structure 620, to be moved in the x-, y-, and z-directions.

The mechanisms discussed above provide coarse or large-scale movement of the support structure 620. However, because of the small diameter of the fiber 610 and the optionally small thickness of the glass article 100, high-precision movement of the support structure 620, and thus the fiber 610, may be desirable. Accordingly, a high-precision positioning stage 750 may be used. The high-precision positioning stage 750 is capable of translation in three orthogonal directions (i.e., the x-, y-, and z-directions), thus the high-precision positioning stage 750 comprises three actuators 751 and 752 (and one not shown) for driving the high-precision positioning stage 750. The support structure 620 is mounted to the high-precision positioning stage 750. Two actuators 751 and 752 drive the high-precision positioning stage 750 in the x- and y-directions, and a third actuator (not shown) drives the high-precision positioning stage 750 in the z-direction, thereby allowing the fiber 610 to be brought into close proximity to the edge 130 of the glass article 100 with high precision.

In embodiments, the support structure 620 may be connected to the high-precision positioning stage 750 by a connector 760 that spans between the support structure 620 and the high-precision positioning stage 750. In some embodiments, the connector 760 provides angle adjustment to the support structure. The connector 760 may provide angle adjustment to the support structure 620 by having a pivot point 761 about which the connector 760 rotates. The pivot point 761 may be any structure that provides a rotational axis for the connector 760, such as a bolt. The pivot point 761 may also be the point at which the connector 760 is fastened to the high-precision positioning stage 750. In embodiments, there is enough friction between the connector 760 and the high-precision positioning stage 750 that when the angle of the support structure 620 is set, the support structure does not move about the pivot point 761 from the set point. In some embodiments, the connector 760 may include a tightener that is tightened to affix the support structure 620 at a given angle and loosened to adjust the angle of the support structure 620.

In embodiments, the fiber feeding system 600 comprises feed wheels 661 and 662 that feed the fiber 610 into the guide tube 650 and ultimately onto the edge 130 of the glass article 100. To accurately be loaded into the feed wheels 661 and 662, a fiber 610 is loaded into a stabilizer 670 via an aperture 671 that stabilizes the fiber 610 prior to its entry into the feed wheels 661 and 662. The aperture 671 in the stabilizer 670 should have about the same dimensions as the fiber 610 to stabilize the fiber 610. The aperture 671 in the stabilizer 670 should be aligned in the x-direction with the spacing between feed wheels 661 and 662 so that the fiber 610 is not required to bend prior to its entry between feed wheels 661 and 662. In some embodiments, the size of the aperture 671 in the stabilizer 670 may be adjustable so that different sized fibers may be used. For example, in some embodiments, a portion of the stabilizer 670 that forms a first surface of the aperture 671 may be stationary and portion of the stabilizer 670 that forms an opposite surface (in the x-direction) of the aperture 671 may be moveable in the x-direction so that the width of the aperture 671 in the x-direction may be modified. The moveable portion of the stabilizer 670 may be fitted with a movement mechanism, such as, for example, a screw drive, that provides precision movement of the moveable portion of the stabilizer, and thus precision adjustment of the aperture width. It should be understood that although the above embodiment describes one side of the stabilizer 670 as moveable, in embodiments both sides of the stabilizer 670 may be moveable.

Feed wheels 661 and 662 are spaced apart so that a small gap is formed in the x-direction between the feed wheels 661 and 662. The width of the gap should be sized so that the feed wheels contact a fiber 610 fed between the feed wheels 661 and 662 with enough tension to gently feed the fiber 610 into the guide tube 650. The gap between the feed wheels 661 and 662 may be adjusted to accommodate fibers 610 having differing diameters. For example, in embodiments, one of a first feed wheel 661 and a second feed wheel 662 may be translatable (e.g., in the x-direction) to adjust the gap. In embodiments the portion of the stabilizer 670 that is moveable is adjacent in the z-direction to the feed wheel 662 that is translatable. The position of the translatable feed wheel 662 may be adjusted with precision via a precision movement mechanism 663. In embodiments, the precision movement mechanism 663 may be a screw drive that adjusts the position of the moveable wheel 662 with precision. It should be understood that although the above embodiments describe feed wheel 662 as the translatable feed wheel, in embodiments feed wheel 661 or both feed wheels 661 and 662 may be translatable.

In addition to the speed at which the glass article 100 is advanced through the edge sealing apparatus 200, the rate at which the fiber 610 is fed contributes to the deposition characteristics of the fiber 610 on the edge 130 of the glass article 100, such as the thickness of the fiber layer. Accordingly, the feed rate of the fiber 610 is capable of being adjusted with precision by modifying the rotational speed of feed wheels 661 and 662. In the embodiment shown in FIG. 3A and FIG. 3B, the rotational speed of feed wheels 661 and 662 is controlled by a motor 680. Feed wheel 661 is a drive wheel that is driven by the motor 680 and feed wheel 662 is an idle wheel that rotates based on the rotation of the drive feed wheel 661. The drive feed wheel 661 may be mechanically connected to the motor 680. For example, as shown in FIG. 3B, the motor 680 comprises a gear 681 and the drive wheel 661 comprises a gear 661a that is attached to the gear 681 of the motor 680 by a drive mechanism 682. In embodiments, the drive mechanism 682 may be a belt, a chain, or a screw. In some embodiments, the drive mechanism 682 may be a heat-resistant chain.

The feed rate at which the fiber 610 is fed to the edge 130 of the glass article 100, in part, determines the deposition characteristics of fiber 610 on the edge 130 of the glass article 100. For example, feeding the fiber 610 at a slow rate applies a thin layer of the fiber 610 to the exposed edge 130 of the glass article 100, provided that the advancement of the glass article 100 through the edge sealing apparatus 200 is held constant. Similarly, feeding the fiber at a fast rate applies a thick layer of the fiber 610 to the exposed edge 130 of the glass article 100, provided that the advancement of the glass article 100 through the edge sealing apparatus 200 is held constant. Therefore, in embodiments, the motor 680 may be a high-precision motor, such as a servomotor or a stepper motor, that is capable of moving the driving mechanism with precision. The motor may be connected to feedback sensors (not shown) that send a signal to a controller (not shown) that precisely controls the movement of the motor and is capable of adjusting the speed at which the drive feed wheel 661 rotates, and thus controls the feed rate of the fiber 610. Using such a high-precision motor, the deposition characteristics, such as thickness, of the fiber 610 on the edge 130 of the glass article 100 may be modified by altering the feed rate of the fiber 610.

Referring again to FIG. 2A, FIG. 2B, and FIG. 4 the laser system 500 of the edge sealing apparatus 200 will be described. In embodiments, the laser system 500 comprises three lasers 510, 520, and 530. The types of lasers that are used are not particularly limited and may be chosen based on the material of the fiber 610 and the material of the glass article 100 on which the fiber 610 is to be applied. For example, different materials will more readily absorb energy of certain wavelengths while not absorbing energy of other wavelengths. Thus, if a laser is used on a material that does not readily absorb the wavelength of the laser, the laser may not adequately heat the material unless the material is doped to include elements that absorb the wavelength of the laser. In embodiments, the lasers 510, 520, and 530 may be CO lasers, $CO_2$ lasers, or xenon lasers. The lasers 510, 520, and 530 may be the same or different types of lasers. Each of the lasers 510, 520, and 530 is coupled to a controller (not shown) that controls the duration and power of the laser beams 510, 520, and 530.

Figure 4:
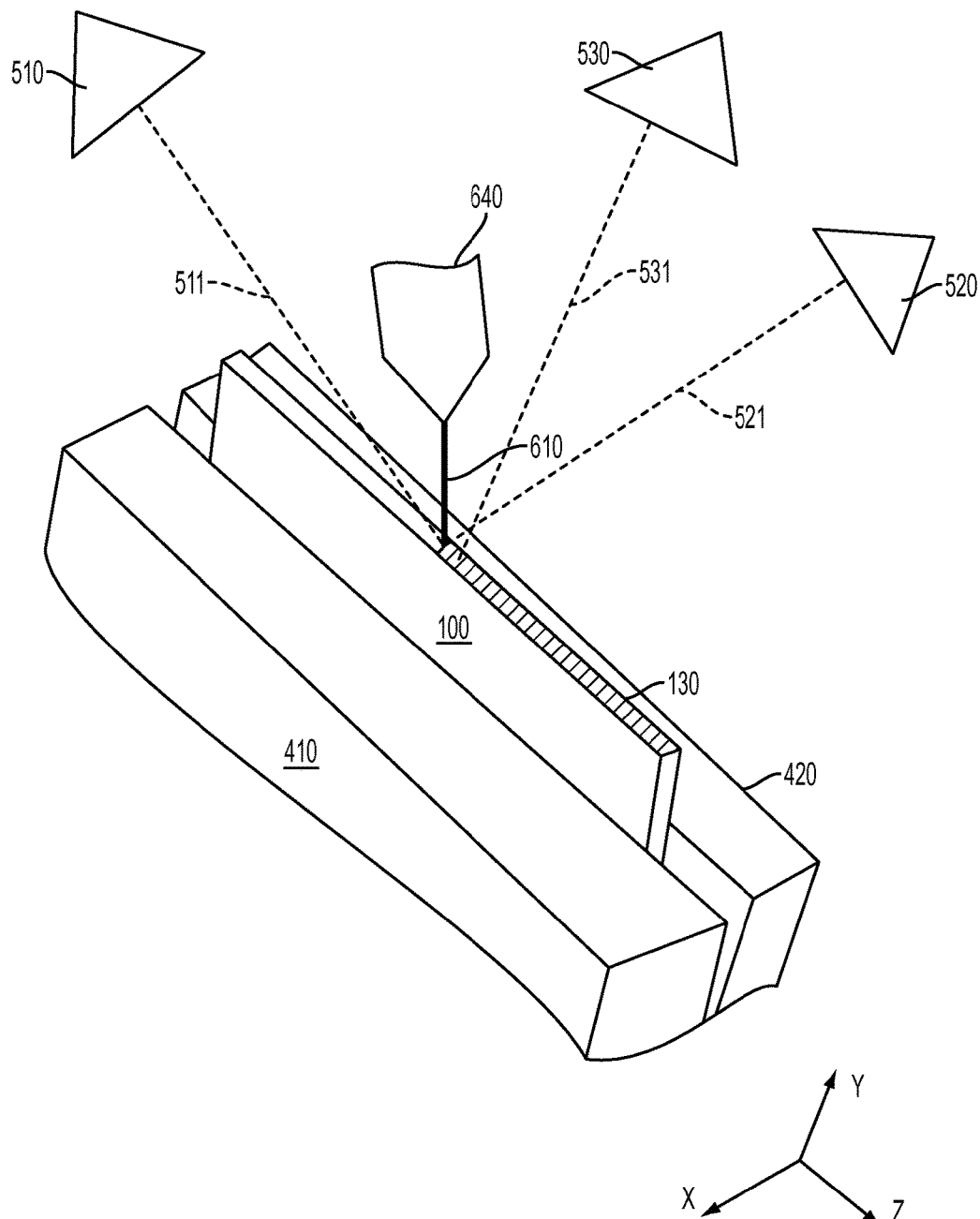
FIG. 4 is a schematic showing the positioning of laser beams on a glass article and a fiber according to embodiments disclosed and discussed herein.

In embodiments, such as the embodiment shown in FIG. 4 lasers 510 and 520 are positioned to project corresponding laser beams 511 and 521 onto opposing sides of the fiber 610 to heat the fiber 610 to a temperature that is about the softening temperature of the fiber 610. In embodiments, the softening point of the fiber is the temperature at which the viscosity of the fiber is about $10^{7.6}$ poise, and the laser beams 511 and 521 heat the fiber to a temperature that is within about 50° C. of the softening point, such as within about 25° C. of the softening point. For example, if the softening point of the fiber is 950° C., laser beams 511 and 521 heat the fiber to a temperature of from about 900° C. to about 1000° C. However, in some embodiments, laser beams 511 and 521 heat the fiber to a temperature from greater than or equal to the softening point of the fiber to a temperature about 50° C. above the softening point of the fiber. In such embodiments, if the softening point of the fiber is 950° C., laser beams 511 and 521 heat the fiber to a temperature of from about 950° C. to about 1000° C.

Laser beams 511 and 521 are configured so that they converge at a point where the fiber is to be fed to create a hot spot when the fiber is fed through the converging laser beams 511 and 521. Accordingly, the position of the fiber 610 exiting the fiber guide 640 is adjusted with precision so that the laser beams 511 and 521 contact opposing sides of the fiber 610. The power and intensity of laser beams 511 and 521 varies depending on the feed rate of the fiber 610 and the speed at which the glass article 100 advances through the edge sealing apparatus 200. For example, the faster the feed rate of the fiber 610 and/or the speed at which the glass article 100 advances through the edge sealing apparatus, the more power and intensity laser beams 511 and 521 may have. Similarly, the slower the feed rate of the fiber 610 and/or the speed at which the glass article 100 advances through the edge sealing apparatus, the less power and intensity laser beams 51 and 521 may have. In embodiments, the power of lasers 510 and 520 is from about 8 W to about 15 W, such as from about 10 W to about 13 W.

Still with reference FIG. 4, laser 530 is positioned to project its corresponding laser beam 531 onto the glass article 100 at just after application of the fiber 610 to the edge 130 of the glass article 100 to heat the edge of the glass article to a temperature greater than the annealing point of the glass article 100 and less than the softening point of the glass article 100. In some embodiments, laser 530 is positioned to project its corresponding laser beam 531 onto the glass article 100 at a position that is from about 0.1 mm to less than about 1 mm from the point where the fiber 610 is applied to the edge 130 of the glass article 100, such as at a position that is from about 0.2 mm to less than about 0.8 mm from the point where the fiber 610 is applied to the edge of the glass article 100. The power of laser 530 is less than the power of lasers 510 and 520. Laser beam 531 does not contact the fiber prior to application to the edge 130 of the glass article, nor does it contact laser beams 511 and/or 521. If the laser beam 531 contacts laser beams 511 and 521 or simultaneously contacts the same portion of the fiber 610 as either of laser beams 511 and/or 521, the intensity of the heat provided by the laser beams 531 and/or 511 and 521 may be too large and the fiber 610 may melt or, if the laser energy is particularly high, vaporize. Accordingly, the position of the fiber 610 exiting the fiber guide 640 is adjusted with precision so that the laser beam 530 does not contact the fiber 610 prior to its application to the edge 130 of the glass article 100. The power and intensity of laser beam 531 varies depending on the speed at which the glass article 100 advances through the edge sealing apparatus 200. For example, the faster the speed at which the glass article 100 advances through the edge sealing apparatus, the more power and intensity laser beam 531 will need. Similarly, the slower the speed at which the glass article 100 advances through the edge sealing apparatus, the less power and intensity laser beam 531 will need. In embodiments, the power of laser 530 is from about 3 W to about 5 W, such as about 4.5 W.

Although the laser system 500 shown in FIG. 2A and FIG. 2B comprises three lasers, other embodiments are included in this disclosure. For example, in some embodiments, the laser system comprises a single laser configured to emit a single laser beam that is subsequently split (e.g., by a beam splitter or another suitable optical device) to form the first laser beam, the second laser beam, and the third laser beam. In other embodiments, the laser system comprises two lasers (e.g., a first laser and a third laser). One laser (e.g., the first laser) is configured to emit a single laser beam that is subsequently split to form the first laser beam and the second laser beam. The other laser (e.g., the third laser) forms the third laser beam. In other embodiments, a determined number of lasers and/or optical devices can be used such that the laser system is configured to emit the first laser beam, the second laser beam, and the third laser beam to seal the edge of the glass article as described herein.

Embodiments discussed herein are directed to an edge-sealing apparatus where the glass article is advanced through the edge-sealing apparatus and the edge-sealing apparatus is stationary. However, it should be understood that the glass article may be held stationary and the edge-sealing apparatus may be moved to advance the glass article relative to the edge sealing apparatus so that the fiber is applied to an edge of the glass article. Alternatively, both the glass article and the edge sealing apparatus may be moved to advance the glass article relative to the edge sealing apparatus so that the fiber is applied to an edge of the glass article.

In various embodiments, the controllers described herein can be responsive to or operable to execute instructions stored as part of software, hardware, integrated circuits, firmware, microcode, or combinations thereof. For example, a controller can be configured to control components of edge sealing apparatus 200 (e.g., the glass article advancement system, laser system 500, and/or fiber feeding system 600). In some embodiments, the controller comprises a memory (e.g., ROM and/or RAM), a storage device (e.g., a hard drive, a flash drive, a CD-ROM, and/or a DVD), a user input device (e.g., a keyboard, a mouse, and/or a touch-screen), an output device (e.g., a display and/or a light), an input/output device (e.g., a network card and/or a serial bus), an operating system (e.g., a Microsoft Windows operating system), an application program and data, or combinations thereof.

Methods for forming an edge-sealed glass article will now be described. The glass article is not limited and may be any cut glass article. In embodiments, and with reference to FIG. 1, the glass article is a laminated glass article 100 having a core layer 110 and a clad layer 121a and 121b. In some embodiments, the core layer 110 and the clad layer 121a and 121b are comprised of the same glass composition. In other embodiments, the core layer 110 and the clad layer 121a and 121b have different compositions.

The glass article 100 is placed in a holder 310 that is detachably coupled to driving mechanism housed in an advancement platform 320. The glass article 100 is advanced through the edge sealing apparatus 200 by the driving mechanism toward a fiber guide tip 640 and laser beam 531. On the advancement path, the glass article is pre-heated by advancing the glass article 100 between heaters 410, 420, and 430 that pre-heat the glass article to a temperature suitable to aid adhesion between a fiber 610 and an edge 130 of the glass article 100. In embodiments, the glass article is pre-heated to a temperature of from about the annealing point temperature (i.e., the temperature where the viscosity of the glass article is about $10^{13.4}$ poise) and below the softening point temperature (i.e., the temperature where the viscosity of the glass is about $10^{7.6}$ poise).

Subsequently, the glass article 100 is advanced under the guide tip of the fiber feeding system where a fiber is deposited on the edge 130 of the glass article 100. Then, the edge 130 of the glass article 100 is heated by laser beam 531 to a temperature above the annealing point of the glass from which the glass article 100 is comprised, but well below the softening point of the glass from which the glass article 100 is comprised. In embodiments, the edge 130 of the glass article 100 is heated by laser beam 531 to a temperature above the annealing point of the glass to a temperature that is about 200° C. below the softening point of the glass, such as about 150° C. below the softening point of the glass. Heating the edge 130 of the glass article 100 with laser beam 531 helps to cure the fiber 610 to the edge 130 of the glass article 100 once the fiber 610 has been deposited.

While the glass article 100 is advancing through the edge sealing apparatus 200, a fiber 610 is fed into the fiber feeding system 600, such as by inserting the fiber 610 into an aperture 671 in a stabilizer 670. The composition of the fiber is not limited provided that the fiber is capable of being adhered to an edge 130 of the glass article 100. In some embodiments, the fiber is a glass fiber. In some embodiments, the composition of the fiber is selected so that the CTE of the fiber is the same or substantially the same as the CTE of the clad layers 121a and 121b of the glass article 100. In other embodiments, the fiber 610 comprises the same glass composition as the clad layer 121a and 121b of the glass article 100.

Once the fiber is initially fed through the stabilizer 670, the fiber 610 is engaged by fiber feed wheels 661 and 662, which regulate the feed rate of the fiber 610. The fiber feed wheels 661 and 662 pull remaining fiber through the stabilizer 670 once the fiber 610 is engaged by the fiber feed wheels 661 and 662. The fiber feed wheels 661 and 662 feed the fiber into a guide tube 650 that protects the fiber 610 from environmental conditions and contaminants and guides the fiber 610 into a fiber guide tip 640. The fiber 610 is fed into a broad portion 641 of the fiber guide tip 640 and channeled to a tapered portion 642 of the fiber guide tip 640.

The fiber 610 exits the fiber guide tip through the tapered portion and is contacted by lasers beams 511 and 521 that heat the fiber to the softening temperature or to a temperature substantially close to the softening temperature of the glass composition from which the glass article 100 is comprised. Laser beam 511 contacts one side of the fiber 610 and laser beam 521 contacts an opposite side of the fiber 610 so that the fiber is uniformly heated. In embodiments, the fiber guide tip is from about 10 mm to about 30 mm from the edge 130 of the glass article 100, such as from about 15 mm to about 25 mm from the edge 130 of the glass article 100. Using laser beams 511 and 521 to heat the fiber just before it is deposited on the edge 130 of the glass article 100 allows intense energy to be applied very locally in the fiber. In embodiments, laser beams 511 and 521 heat the fiber at a position that is from about 10 µm to less than about 1000 µm from the edge 130 of the glass article 100, such as from about 15 µm to about 750 µm from the edge 130 of the glass article 100. In other embodiments, laser beams 511 and 521 heat the fiber at a position that is from about 20 µm to less than about 500 µm from the edge 130 of the glass article 100, such as from about 30 µm to about 400 µm from the edge 130 of the glass article 100. Therefore, only the portion of the fiber that is about to contact the edge 130 of the glass article 100 is heated to the softening point, or heated substantially to the softening point. Accordingly, the remainder of the fiber remains rigid, which allows the fiber feed rate to remain consistent and allows the fiber to be applied to the edge 130 of the glass article 100 with precision. For instance, if the fiber 610 was heated to the softening point into the guide tip 640, the guide tip 640 would become clogged with the softened fiber and backup would occur.

In embodiments, the feed rate of the fiber and the speed at which the glass article advances through the edge sealing apparatus 200 are initially set to be the same or substantially the same. Subsequently, one of the feed rate or the speed at which the glass article advances through the edge sealing apparatus 200 is increased and/or one of the feed rate or the speed at which the glass article advances through the edge sealing apparatus 200 is decreased to modify the deposition characteristics of the fiber 610 on the edge 130 of the glass article 100. For example, in some embodiments, the feed rate and the speed at which the glass article advances through the edge sealing apparatus 200 are initially set at about 1 mm/s and the feed rate is subsequently increased to about 3 mm/s while the speed at which the glass article advances through the edge sealing apparatus 200 is maintained at 1 mm/s to provide thicker fiber deposition on the edge 130 of the glass article 100. In embodiments, the feed rate and/or the speed at which the glass article advances through the edge sealing apparatus 200 may be from about 1 mm/s to about 5 mm/s, such as from about 2 mm/s to about 4 mm/s. However, it should be understood that the speed at which the glass article advances through the edge sealing apparatus 200 is not particularly limited and may be increased according to the power of the lasers.

Figure 5:
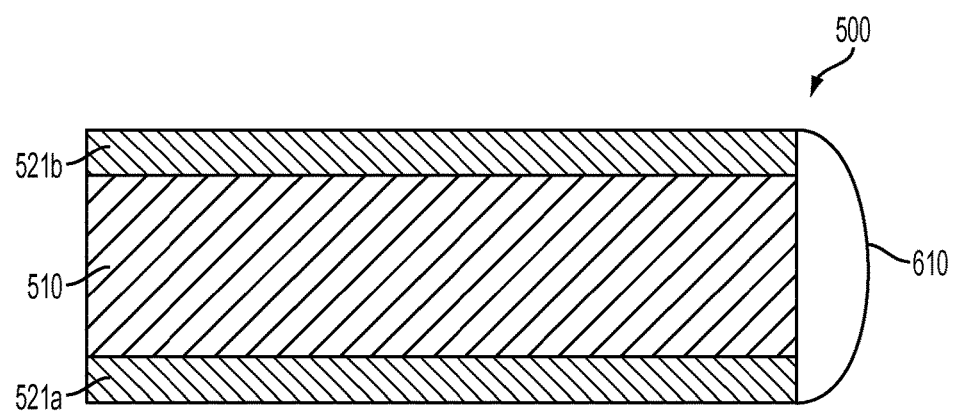
FIG. 5 is a schematic of a laminated glass article have a sealed edge according to embodiments disclosed and discussed herein.

Referring now to FIG. 5, a glass article 500 with a sealed edge is shown. The glass article 500 is a laminated glass article with a core layer 510 and clad layers 521a and 521b. However, one exposed edge has been sealed with a fiber 610 so that the edge of the glass article is not exposed. Although FIG. 5 shows a glass article 500 with only one edge sealed with a fiber 610, it should be understood that in some embodiments multiple exposed edges may be sealed with a fiber.

Based on the foregoing, it should be understood that various apparatus and methods for sealing an edge of a glass article are disclosed. In a first exemplary embodiment, an apparatus for sealing an edge of a glass article is disclosed. The apparatus comprises: a fiber feeding system to deposit a fiber on the edge of the glass article; and a laser system comprising at least a first laser, a second laser, and a third laser. The first laser is positioned to project a first laser beam onto a first side of the fiber at a contact point that is from about 10 μm to less than about 1000 μm from the edge of the glass article. The second laser is positioned to project a second laser beam onto a second side of the fiber that is opposite the first side of the fiber at the contact point. The third laser is positioned to project a third laser beam onto the edge of the glass article at a point that is from about 0.1 mm to less than about 1 mm from a point where the fiber is deposited on the edge of the glass article.

In a second exemplary embodiment, a method for forming a sealed glass article is disclosed, the method comprises: advancing the glass article relative to a fiber; positioning the fiber in relation to an edge of the glass article; contacting a first side of the fiber with a first laser and contacting a second side of the fiber with a second laser at a point that is from about 10 μm to less than about 1000 μm from the edge of the glass article; depositing the fiber on the edge of the glass article; and contacting the edge of the glass article with a third laser at a point that is from about 0.1 mm to less than about 1 mm from a point where the fiber is deposited on the edge of the glass article.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An apparatus for sealing an edge of a glass article, the apparatus comprising:
   a fiber feeding system to deposit a fiber on the edge of the glass article; and
   a laser system configured to emit a first laser beam, a second laser beam, and a third laser beam, wherein
   the laser system is positioned to project the first laser beam onto a first side of the fiber at a contact point that is from about 10 μm to about 1000 μm from the edge of the glass article,
   the laser system is positioned to project the second laser beam onto a second side of the fiber that is opposite the first side of the fiber at the contact point, and
   the laser system is positioned to project the third laser beam onto the edge of the glass article at a point that is from about 0.1 mm to about 1 mm from a point where the fiber is deposited on the edge of the glass article.

2. The apparatus according to claim 1, wherein the glass article is a laminated glass article comprising a core layer and at least one clad layer, and
   the laminated glass article is cut to expose the core layer and the at least one clad layer on the edge of the glass article and the fiber is deposited on the exposed at least one core layer and at least one clad layer of the glass article.

3. The apparatus according to claim 2, wherein the fiber is a glass fiber having the same or substantially the same coefficient of thermal expansion as a glass from which the at least one clad layer of the laminated glass article is comprised.

4. The apparatus according to claim 2, wherein the fiber is a glass fiber having the same composition as a glass from which the at least one clad layer is comprised.

5. The apparatus according to claim 1, further comprising a pre-heating system comprising a plurality of heaters configured to heat the glass article to a temperature of about an annealing temperature of the glass article before the fiber is deposited on the edge of the glass article.

6. The apparatus according to claim 5, wherein the plurality of heaters comprises a first heater positionable on one side of the glass article and a second heater positionable on an opposing side of the glass article.

7. The apparatus according to claim 5, wherein the plurality of heaters comprises a ceramic filament heater.

8. The apparatus according to claim 1, wherein the laser system comprises a $CO_2$ laser.

9. The apparatus according to claim 1, wherein the first laser beam and the second laser beam have the same power, and the third laser beam has a power that is lower than the power of the first laser beam and the second laser beam.

10. The apparatus according to claim 9, wherein the power of the first laser beam and the second laser beam is from about 8 W to about 15 W, and the power of the third laser beam is from about 3 W to about 5 W.

11. The apparatus according to claim 1, wherein the first laser beam and the second laser beam heat the fiber to a softening point or substantially to a softening point of the fiber.

12. The apparatus according to claim 1, further comprising a glass article advancement system, wherein
   the glass article advancement system is stationary in two directions, and
   the fiber feeding system is moveable in at least the two directions in which the glass article advancement system is stationary such that the fiber may be aligned with the edge of the glass article by moving the fiber feeding system in the two directions.

13. The apparatus according to claim 1, wherein the fiber feeding system is adjustable such that a deposition angle of the fiber may be adjusted.

14. The apparatus according to claim 1, further comprising:
a first controller that controls a power of the first laser beam and a power of the second laser beam based on a feed rate of the fiber; and
a second controller that controls a power of the third laser beam based on a speed at which the glass article advances.

15. The apparatus according to claim 1, wherein the laser system comprises:
a first laser configured to emit the first laser beam;
a second laser configured to emit the second laser beam; and
a third laser configured to emit the third laser beam.

16. A method for forming a sealed glass article, the method comprising:
advancing the glass article relative to a fiber;
positioning the fiber in relation to an edge of the glass article;
contacting a first side of the fiber with a first laser beam and contacting a second side of the fiber with a second laser beam at a point that is from about 10 μm to about 1000 μm from the edge of the glass article;
depositing the fiber on the edge of the glass article; and
contacting the edge of the glass article with a third laser beam at a point that is from about 0.1 mm to about 1 mm from a point where the fiber is deposited on the edge of the glass article.

17. The method according to claim 16, further comprising pre-heating the glass article with a plurality of heaters prior to depositing the fiber on the edge of the glass article.

18. The method according to claim 16, wherein a speed at which the glass article is advanced is the same as a feed rate of the fiber.

19. The method according to claim 16, wherein a speed at which the glass article is advanced is not the same as a feed rate of the fiber.

20. The method according to claim 16, wherein a power of the first laser beam and a power of the second laser beam are greater than a power of the third laser beam.

21. The method according to claim 16, wherein
a power of the first laser beam and a power of the second laser beam are controlled based on a feed rate of the fiber, and
a power of the third laser beam is controlled based on the speed at which the glass article is advanced.

* * * * *

UNITED STATES PATENT AND TRADEMARK OFFICE
CERTIFICATE OF CORRECTION

PATENT NO. : 10,513,455 B2  
APPLICATION NO. : 15/521112  
DATED : December 24, 2019  
INVENTOR(S) : Thomas Roger Cook et al.

Page 1 of 1

It is certified that error appears in the above-identified patent and that said Letters Patent is hereby corrected as shown below:

On page 2, in Column 2, item (56), Other Publications, Line 9, delete "Searaching" and insert -- Searching --, therefor.

Signed and Sealed this  
Eleventh Day of February, 2020

Andrei Iancu  
*Director of the United States Patent and Trademark Office*